United States Patent Office 3,094,405
Patented June 18, 1963

3,094,405
DEFOLIANT METHODS USING THIO ESTERS OF CHLOROMETHYL PHOSPHONOUS AND CHLOROMETHYL PHOSPHONIC ACIDS
Arthur Dock Fon Toy, Park Forest, and Edward N. Walsh, Chicago Heights, Ill., and Joseph R. Froli, Jr., San Jose, Calif., assignors to Stauffer Chemical Company, New York, N.Y., a corporation of Delaware
No Drawing. Filed Feb. 8, 1961, Ser. No. 87,767
10 Claims. (Cl. 71—2.3)

This invention relates to a new class of phosphonate esters and a process for utilizing the same.

In particular, this invention relates to new chloromethylphosphonate compounds which have been found to have valuable properties as plant defoliants. These valuable properties are thought to be the result of a novel combination of the chloromethyl radical with various thio ester radicals.

The new compounds of this invention are the thio esters of chloromethylphosphonic acid, chloromethylphosphonous acid or chloromethylphosphonothiolic acid. They may be represented by the formula

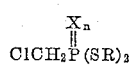

wherein R may be the same or different alkyl or aryl radicals, X may be oxygen or sulfur and $n$ is 0 or 1.

These compounds may be made by reacting a chloromethylphosphorus chloride with the desired thio alcohol, thio phenol, or their alkali metal salts. This is preferably done in the presence of an HCl acceptor such as sodium hydroxide, tertiary amines and the like, but will also proceed in the absence of such an acceptor. This reaction is illustrated as follows:

wherein R, X and $n$ are defined as above and $R'_3N$ is a tertiary amine, but may be another HCl acceptor as noted above.

Among the radicals which we have found suitable to form the ester groups represented by R in the above formulas, are the methyl, ethyl, propyl, isopropyl, butyl, n-butyl, amyl, octyl, decyl, phenyl, chlorophenyl, nitrophenyl and the like. In particular, we prefer the n-butyl radical because of the excellent defoliating properties of its esters.

It is surprising that these compounds should be such effective defoliants since various other similar phosphonic acid thio esters have not demonstrated this property. Likewise, similar well-known chloromethylphosphonate esters do not have this property. As noted previously, it is thought to be the unique combination of the chloromethyl group and the thio ester group which provides the excellent defoliating action.

The following examples illustrate the products of this invention.

EXAMPLE 1.—S,S-DIETHYL CHLOROMETHYLPHOSPHONODITHIOATE

To a solution of 35.0 grams of $C_2H_5SH$ and 55.2 grams of $(C_2H_5)_3N$ in 200 ml. of benzene is added 41.8 grams of $ClCH_2POCl_2$ in 10 ml. of benzene. The mixture is stirred during the addition and the temperature is held at 25°–30° C. The mixture contained considerable triethylamine hydrochloride and was then stirred at 25°–30° C. for an additional 2 hours and then warmed to 50° C. for 2 hours. After cooling the amine hydrochloride was removed by filtration and the benzene distilled. The product boiled at 130° C. at 1 mm. of Hg pressure. 49.0 grams of $ClCH_2P(O)(SC_2H_5)_2$ resulted which analyzed 14.8% P. Theory is P, 14.29 and had an index of refraction $N_D^{25}=1.5559$.

EXAMPLE 2.—S,S-DI-TERT. BUTYL CHLOROMETHYLPHOSPHONODITHIOATE

Following the procedure of Example 1, 51.0 grams of $ClCH_2P(O)[SC(CH_3)_3]_2$ was prepared by reacting 41.8 grams of $ClCH_2POCl_2$ in 10 ml. of benzene with 50 grams of $(CH_3)_3CSH$ and 55.2 grams of $(C_2H_5)_3N$ in 200 ml. of benzene. The resulting product analyzed 11.6% P compared to the theoretical value of 11.3% P. It had an index of refraction $N_D^{25}=1.5317$.

EXAMPLE 3.—S,S-DI-N-BUTYL CHLOROMETHYLPHOSPHONODITHIOATE

To 50 grams of n-$C_4H_9SH$ and 55.2 grams of $(C_2H_5)_3N$ in 200 ml. of benzene was added 42.1 grams of $ClCH_2POCl_2$ at 25°–30° C. over a period of 16 minutes. The resultant mixture was allowed to stand for 16 hours at room temperature and then filtered. The filter cake was rinsed with 100 ml. of benzene and the benzene solution was then evaporated to give 61.3 grams of $ClCH_2P(O)(SC_4H_9)_2$ which had an index of refraction $N_D^{25}=1.5287$ and analyzed as 11.4% P and 24.8% S compared to the theoretical values of 11.3% P and 23.3% S. It boiled at 150°–151° C. at 1 mm. Hg pressure.

EXAMPLE 4.—S,S-DI-N-BUTYL CHLOROMETHYLPHOSPHONOTRITHIOATE

Following the procedure of Example 3, except that 45.7 grams of $ClCH_2P(S)Cl_2$ was used, 54.0 grams of $ClCH_2P(S)(SC_4H_9)_2$ was produced. This product had an index of refraction $N_D^{25}=1.5661$. It boiled at 163°–165° C. at 1.5 mm. Hg pressure, and analyzed 10.8% P and 33.1% S. The theoretical values are P, 10.6%; S, 33.0%.

EXAMPLE 5.—S,S-DI-N-BUTYL CHLOROMETHYLPHOSPHONODITHIOITE

To 50.0 grams of n-$C_4H_9SH$ and 55.2 grams of $(C_2H_5)_3N$ in 200 ml. of benzene were added 37.8 grams of $ClCH_2PCl_2$ at 25°–30° C. over a 30 minute period. After standing 20 hours it was filtered and the cake washed with 100 ml. of benzene. After evaporation of the benzene, 44.0 grams of $ClCH_2P(SC_4H_9)_2$ resulted which had an index of refraction $N_D^{25}=1.5400$ and boiled at 128°–130° C. at 1 mm. It analyzed as 11.8% P and 25.6% S compared to 12.0% P and 24.8% S theoretical.

EXAMPLE 6.—S,S-DI-DODECYL CHLOROMETHYLPHOSPHONODITHIOATE

In a manner similar to Example 1, 40.5 grams of $C_{12}H_{25}SH$ and 22.0 grams of $(C_2H_5)_3N$ were reacted with 16.7 grams of $ClCH_2P(O)Cl_2$ to give 49.8 grams of $ClCH_2P(O)(SC_{12}H_{25})_2$ which had an index of refraction $N_D^{25}=1.4925$ and analyzed 6.5% P and 12.5% S. This compares with the theoretical values of P, 6.2%; S, 12.8%.

EXAMPLE 7.—S,S-DI-p-CHLOROPHENYL CHLOROMETHYLPHOSPHONODITHIOATE

To 16.7 grams of $ClCH_2POCl_2$ and 20.0 grams of $ClC_6H_4SH$ in 200 ml. of ether was added 22.0 grams $(C_2H_5)_3N$ at 25°–35° C. The mixture was heated at reflux for 24 hours. Then 200 ml. of water was added to dissolve the amine hydrochloride. The solid product was then filtered out and dried to give 28.5 grams of $ClCH_2P(O)(SC_6H_4Cl)_2$ which had a melting point of 110° C. The ether phase was separated from the filtrate and evaporated to give an additional 8.0 grams of product.

EXAMPLE 8.—S,S-DIPHENYL CHLOROMETHYLPHOSPHONODITHIOATE

Following the procedure of Example 7, 16.7 grams $ClCH_2POCl_2$ and 23.0 grams of $C_6H_5SH$ were added to 22.0 grams $(C_2H_5)_3N$ at 25°–30° C. and allowed to reflux. The resulting $ClCH_2P(O)(SC_6H_5)_2$ weighed 26.0 grams and had an index of refraction $N_D^{25}=1.6454$.

The class of compounds characterized by the foregoing examples has been found to have valuable plant defoliant properties. Plant defoliants are becoming increasingly valuable as agricultural aids because of the increased used of mechanical crop pickers. Thus in the case of cotton, it is desirable to have all of the leaves fall off the plant prior to picking in order to produce a cleaner, higher grade of cotton. Such a procedure is also valuable in picking beans and similar crops.

In the following test, cotton plants were sprayed with solutions of the defoliant using 1 to 5 lbs./acre equivalent of the defoliant in 80 gallons of solution per acre. The procedure used is well-known in the art. Table I shows the results obtained on cotton plants.

*Table I*

| Compound | Rate of Application | Days after Application | Percent Defoliation |
| --- | --- | --- | --- |
| Product of Example 3 | 1 lb./A | 5 | 0 |
| Do | 1 lb./A | 25 | 0 |
| Do | 4 lb./A | 5 | 25 |
| Do | 4 lb./A | 25 | 75 |
| Do | 5 lb./A | 8 | 50 |
| Do | 5 lb./A | 26 | 80 |

In conducting the above tests, the percent defoliation in some instances includes leaves which were severely dessicated but had not completely fallen from the plant. The tests definitely show that these compounds provide a new class of defoliants.

The products of this invention may be applied to the plants to be defoliated in the form of solutions, emulsions, dusts or aerosols, according to procedures which are well-known in the art. In the case of solutions in petroleum solvents or common organic solvents such as alcohols, chlorinated hydrocarbons and so forth, the solution itself may be applied directly or may be dispersed in an aqueous system for purposes of convenience and economy. Dusts may be prepared directly at field strength using the well-known absorbent clays or talcs or they may be prepared as concentrates which may then be diluted with inert diluents for field application. The actual method of preparation and application is not a critical part of this invention but will vary with each compound according to the plant to be defoliated and the conditions under which the defoliant is applied.

The foregoing description is given for clearness of understanding only and no unnecessary limitations should be derived therefrom as modifications will be obvious to those skilled in the art.

We claim:

1. A method of defoliating plants which comprises applying thereto a defoliating quantity of a compound having the formula $$ClCH_2\overset{X_n}{\underset{\|}{P}}(SR)_2$$

wherein R is a member of the class consisting of alkyl radicals having up to 12 carbon atoms and monocyclic aryl radicals, X is a member of the class consisting of oxygen and sulfur and $n$ is a number selected from the class consisting of 1 and 0.

2. A method according to claim 1 wherein R is butyl.

3. A method of defoliating plants which comprises applying thereto a defoliating quantity of $$ClCH_2P(O)(SC_2H_5)_2$$

4. A method of defoliating plants which comprises applying thereto a defoliating quantity of $$ClCH_2P(O)[SC(CH_3)_3]_2$$

5. A method of defoliating plants which comprises applying thereto a defoliating quantity of $$ClCH_2P(O)(SCH_2CH_2CH_2CH_3)_2$$

6. A method of defoliating plants which comprises applying thereto a defoliating quantity of $$ClCH_2P(S)(SCH_2CH_2CH_2CH_3)_2$$

7. A method of defoliating plants which comprises applying thereto a defoliating quantity of $$ClCH_2P(SCH_2CH_2CH_2CH_3)_2$$

8. A method of defoliating plants which comprises applying thereto a defoliating quantity of $$ClCH_2P(O)(SC_{12}H_{25})_2$$

9. A method of defoliating plants which comprises applying thereto a defoliating quantity of $$ClCH_2P(O)(SC_6H_5)_2$$

10. A method of defoliating plants which comprises applying thereto a defoliating quantity of $$ClCH_2P(O)(SC_6H_4Cl)_2$$

References Cited in the file of this patent

UNITED STATES PATENTS

| | | |
| --- | --- | --- |
| 2,392,841 | Detrick et al. | Jan. 15, 1946 |
| 2,573,568 | Harman et al. | Oct. 30, 1951 |
| 2,599,761 | Harman et al. | June 10, 1952 |
| 2,708,204 | Bell | May 10, 1955 |
| 2,910,402 | Fairchild | Oct. 27, 1959 |
| 2,967,884 | Dunn et al. | Jan. 10, 1961 |
| 2,988,565 | Toy | June 13, 1961 |

FOREIGN PATENTS

| | | |
| --- | --- | --- |
| 586,739 | Canada | Nov. 10, 1959 |
| 751,755 | Great Britain | July 4, 1956 |

OTHER REFERENCES

Shepeleva et al., Proc. Acad. Sci. USSR, Sect. Chem. (English translation) 106, 457–458 (1956).